UNITED STATES PATENT OFFICE.

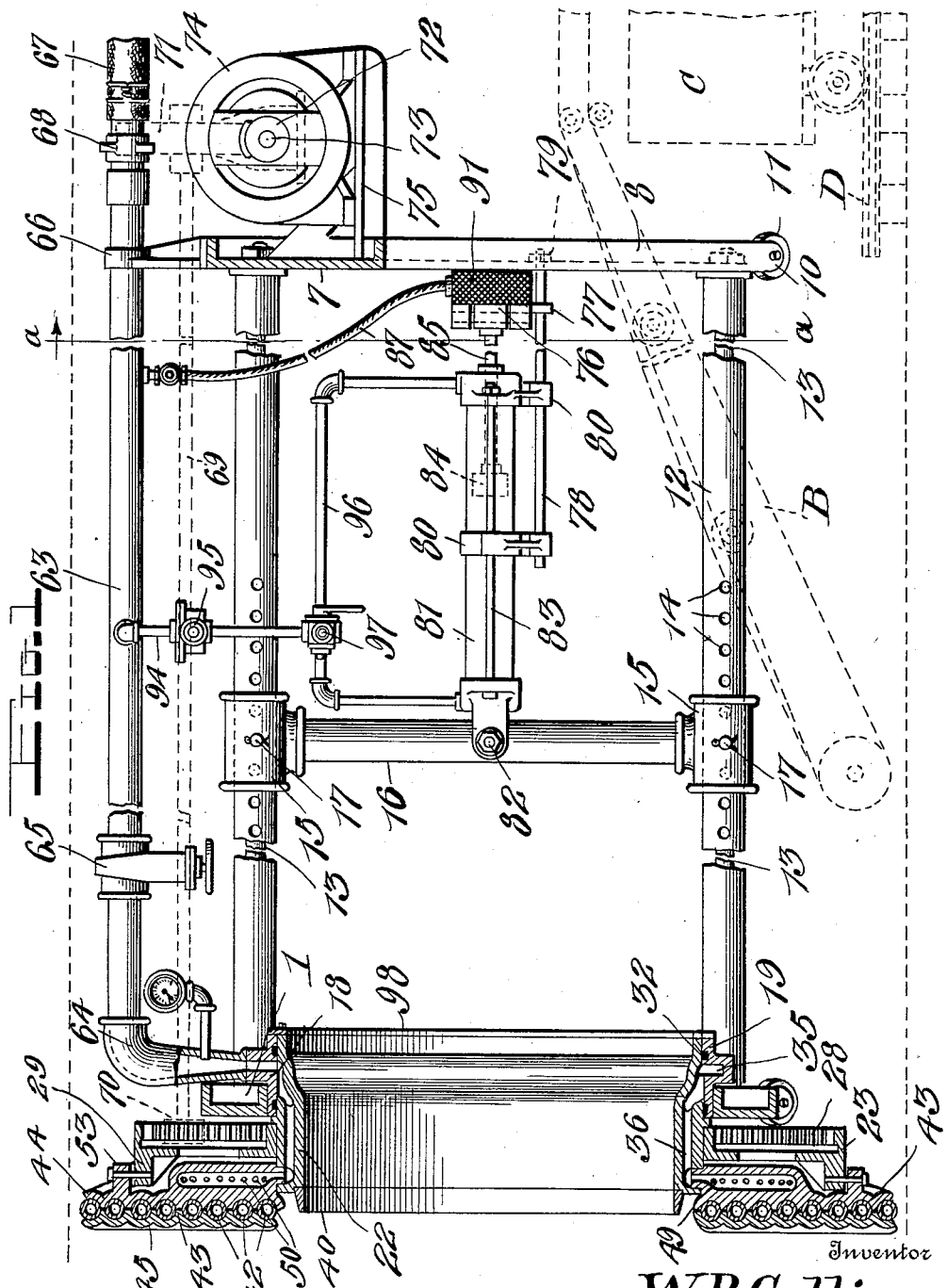

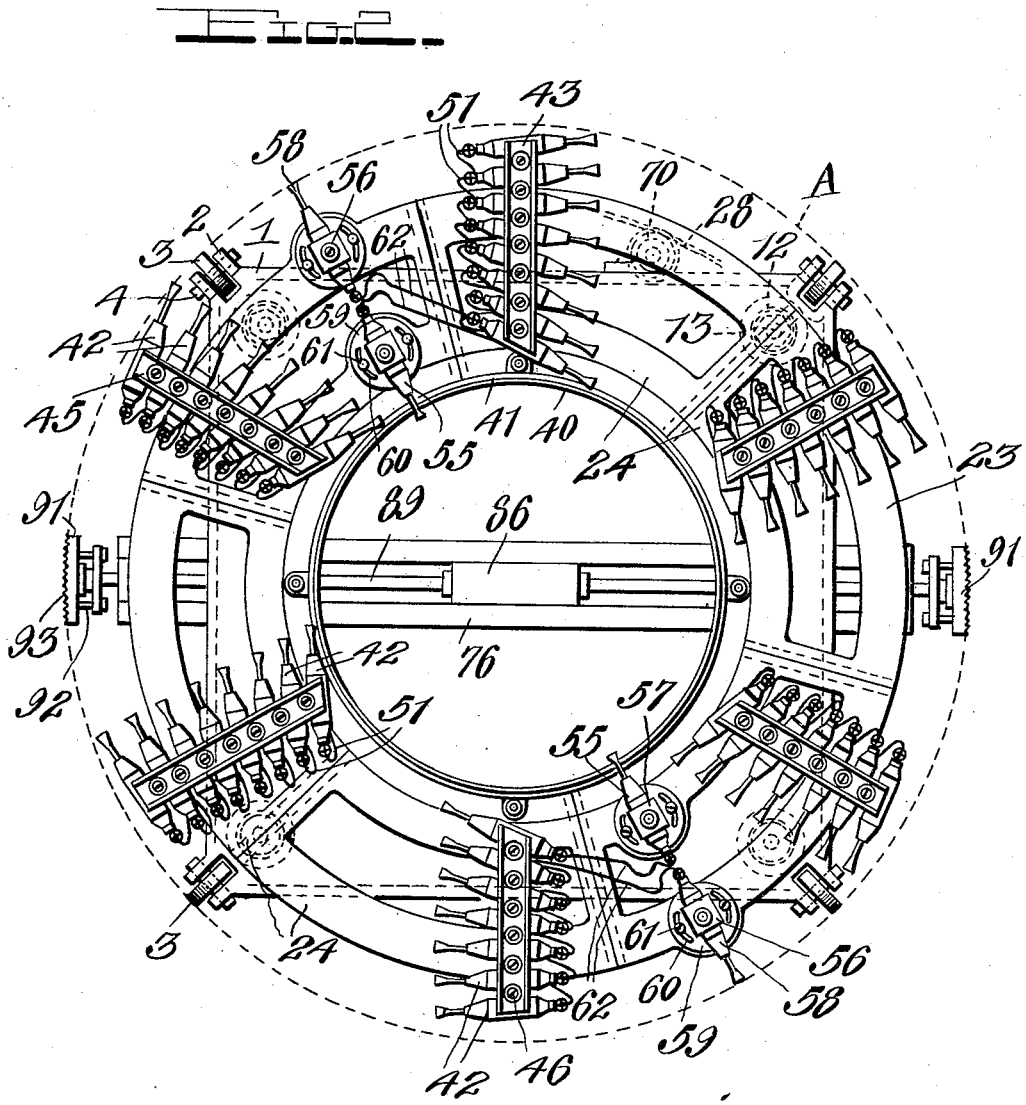

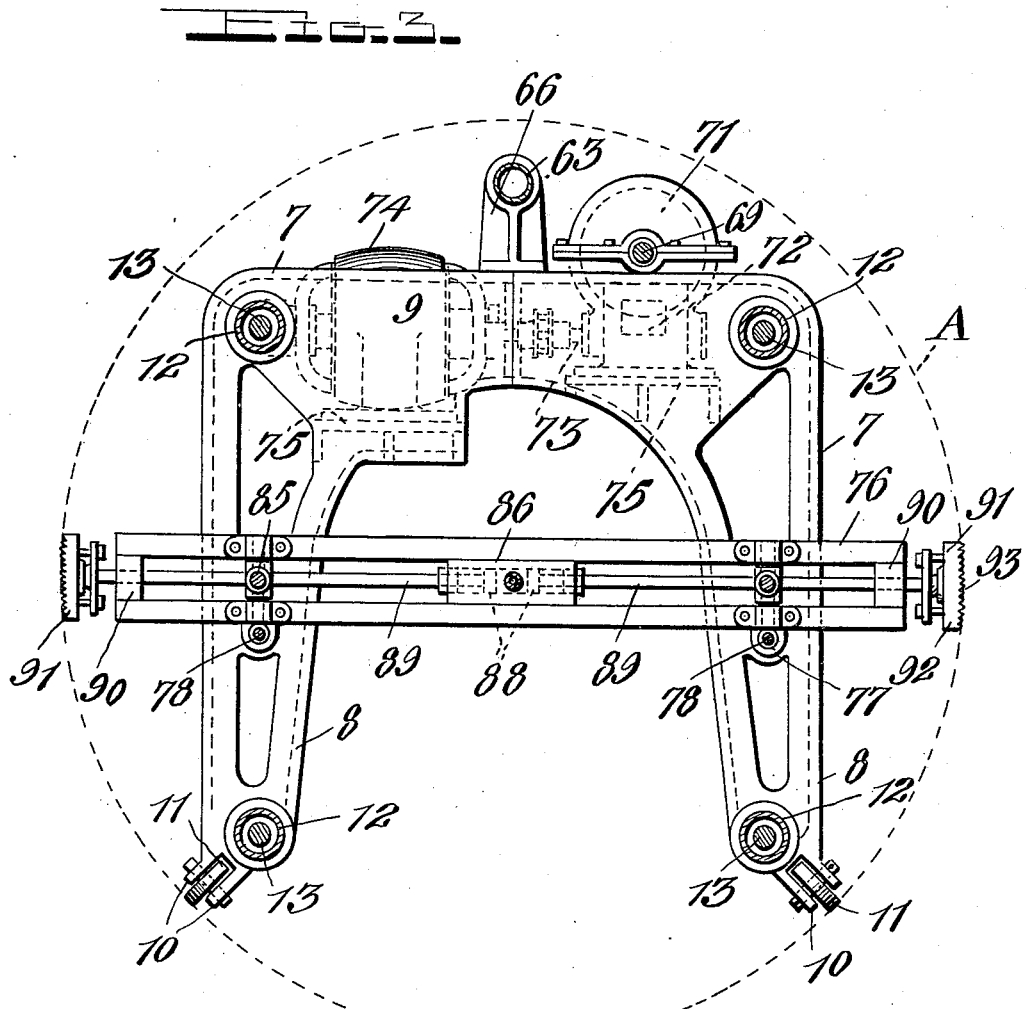

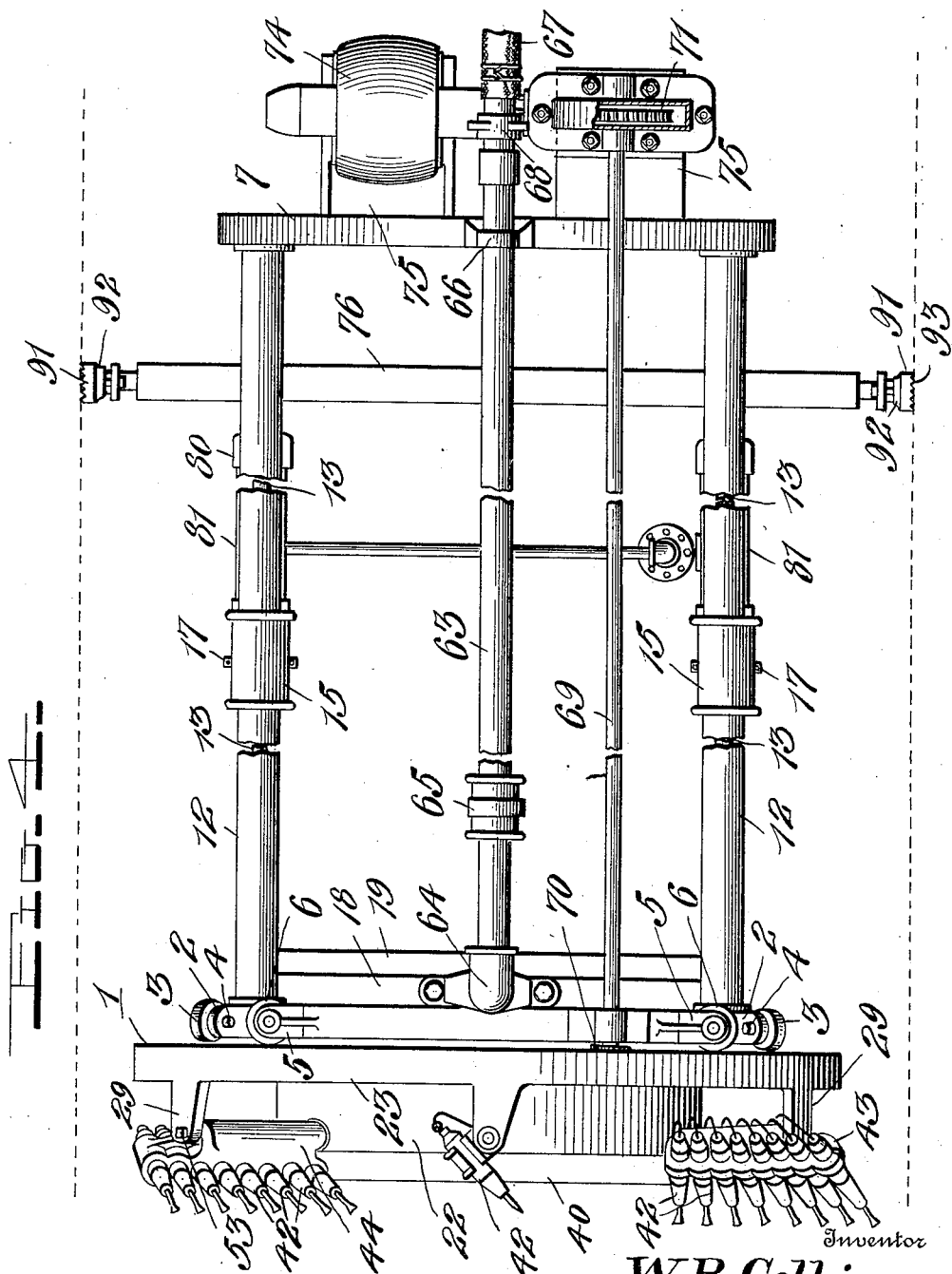

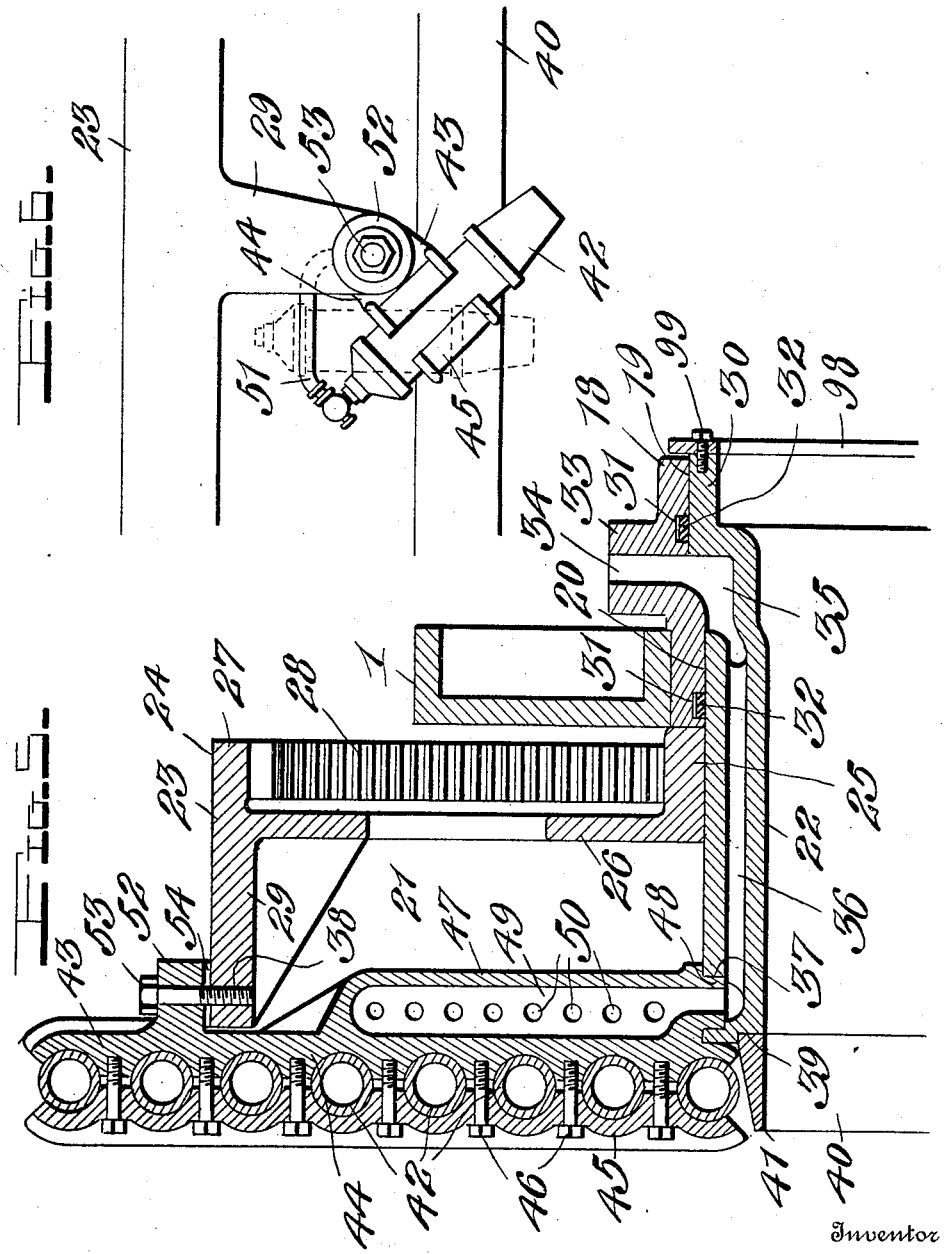

WILLIAM R. COLLINS, OF GEORGETOWN, COLORADO.

TUNNELING-MACHINE.

1,000,075. Specification of Letters Patent. Patented Aug. 8, 1911.

Application filed July 27, 1910. Serial No. 574,147.

*To all whom it may concern:*

Be it known that I, WILLIAM R. COLLINS, a citizen of the United States, residing at Georgetown, in the county of Clear Creek and State of Colorado, have invented certain new and useful Improvements in Tunneling-Machines, of which the following is a specification, reference being had to the accompanying drawings.

This invention is an improved machine for tunneling through rock without the necessity of blasting and for making an annular tunnel which leaves a central uncut rock core which may be readily broken off from time to time as the machine advances and which saves a large percentage of expensive drill cutting.

One object of my invention is to effect improvements in the construction of the carriage.

Another object is to effect improvements in the construction of the end frames of the carriage.

Another object is to effect improvements in the construction of the cutting head.

Another object is to effect improvements in the construction of the drill carriers by means of which the drills are mounted on the cutting head.

A further object is to combine in a machine of this character with a revoluble cutting head, a carrier for carrying any suitable number of pneumatic drills, which carrier is pivotally mounted on the cutting head so that it may be turned angularly as may be required to dispose the drills in the most advantageous angular position according to the nature of the work.

Another object is to provide improved means for steadying the carriage in the tunnel while the cutting head is at work, and so as to prevent casual deviations from a right line.

A further object of the invention is to effect improvements in the means for advancing the machine from time to time in the tunnel as the work progresses, so as to keep the drills at work on the breast of the tunnel.

With the above and other objects in view, the invention consists in the construction, combination and arrangement of devices hereinafter described and claimed.

In the accompanying drawings:—Figure 1 is a vertical longitudinal sectional view of a tunneling machine constructed in accordance with my invention. Fig. 2 is a front elevation of the same. Fig. 3 is a transverse sectional view of the same on the plane indicated by the line *a—a* of Fig. 1, looking rearwardly. Fig. 4 is a plan of the same. Fig. 5 is a detail sectional view on a larger scale of the cutting head, the head frame, and one of the drill carriers. Fig. 6 is a detailed elevation of one of the drill carriers.

The carriage of my improved tunneling machine is provided with a head frame 1, which is rectangular in form, and is provided with a circular central opening. At the corners of the head frame are pairs of radially disposed outwardly projecting spaced lugs 2, between which are mounted supporting rollers 3, the said rollers having axle shafts 4 which operate in bearing openings with which the said lugs are provided. Two of the said supporting rollers, when the machine is in operation, bear near the bottom of the tunnel, the upper rollers bearing near the top thereof as indicated in Fig. 2. The said head frame is further provided on its sides with pairs of lugs 5 between which are mounted anti-friction rollers 6, for a purpose presently described. The rear frame 7 of the carriage is of substantially inverted U-shape, having a pair of vertical side arms 8, and a horizontal arched portion 9 connecting the upper ends of said side arms. At the lower ends of the said side arms are pairs of lugs 10 between which are mounted supporting rollers 11 which also bear on the lower portion of the tunnel.

The head frame 1 and the rear frame 7 are connected together by tubular side bars 12 and by bolt rods 13, the said bolt rods extending centrally through the said tubular bars and also through the head and rear frames and being provided at their ends with nuts which bear on the outer sides of said head and rear frames, the said bolt rods coacting with the said tubular side bars to secure the latter between the head and rear frames and to connect said frames together. The said tubular side bars on the opposite sides of the carriage are provided with longitudinal series of adjusting openings 14. Sleeves 15 are disposed on the said tubular side bars for longitudinal movement and are connected together by vertical bars 16. The said sleeves are provided with openings which may be caused to register with any of the openings 14 according to the longitudinal adjustment of said sleeves and said bars 16, and said sleeves and bars may be secured at any desired longitudinal adjustment by means of suitable pins 17 inserted in said registering openings. In the central circular opening of the head frame is secured the front portion of an annular fixed bearing sleeve 18. The diameter of the rear portion 19 of said bearing sleeve is somewhat greater than that of the front portion 20 thereof.

The revoluble cutting head 21 of the machine comprises an annular drum 22, and a gear 23. The said gear is here shown as comprising a plurality of segments 24 secured together as by means of bolts, each segment comprising a hub portion 25, a web portion 26, and a rim portion 27. The hub of the cutter head gear is fitted on the drum 22 and bears against the front portion 20 of the bearing sleeve 18. The rear overhanging portion of the rim 27 is provided with internal spurs or teeth 28. Each section of the cutter head gear has its rim portion formed with a forwardly extending arm 29. The diameter of the front portion and major portion of the drum 22 is such as to enable the same to fit not only in the hub of the cutter head gear but also in the front portion 20 of the bearing sleeve 18. The diameter of the rear portion 30 of said drum is such as to enable the same to fit in the diametrically enlarged rear portion 19 of said bearing sleeve. The latter is provided with internal annular channels 31 in which are packing rings 32 which effect air tight joints between the said drum and the said bearing sleeve. The said bearing sleeve is provided, preferably on its upper side, with a nipple 33 or other means for the attachment of a compressed air supply pipe thereto, and in the said nipple is an air inlet passage 34 which communicates with an annular air passage or channel 35 with which the rear portion of the drum 22 is provided. Air passages 36 are also made in the said drum, which extend forwardly from the said channel 35, and terminate at their front ends in radial outwardly directed bearing openings 37 with which the said drum is provided. The said bearing openings are coincident with threaded openings 38 in the brackets 29.

In the front end of the drum 22, is an annular channel 39 for the reception of the rear end of a guard ring 40, said guard ring projecting forwardly from the said drum and corresponding as to its internal diameter with that of the front and major portion of said drum. The outer side of the said guard ring is beveled so that said guard ring presents a narrow edge 41, at its front side. The said guard ring is, in practice, made of tempered steel or other suitable hard and durable material. The guard ring may, when it becomes worn, be removed from the front end of the drum and replaced by another, and serves to prevent the drum from being worn during the operation of the machine.

The pneumatic drills 42 or drills of any other suitable type which operate in the breast of the tunnel are mounted in series in drill carriers 43, each of which comprises a pivot member 44, and an outer clamping member 45 secured thereto by means of bolts 46. These members have openings formed in their opposing sides for the reception of the said drills and it is obvious that the drills may be clamped in position between the said members as tightly as may be required and that they are removable from the carriers so that any one of them which may become worn or injured may be replaced by another in a very short time. The pivot member of each drill carrier is provided on its rear side with an enlarged portion 47 which is provided at its inner end with a journal 48 mounted in one of the openings 37 of the drum, and coacting therewith to pivotally mount the inner end of the drill carrier. The said enlarged portion 47 is also provided with an air chamber 49 which communicates with the air passage 36 and is provided with a suitable number of openings 50 affording means for the attachment of tubes 51 which supply compressed air to the drills, there being one of these tubes for each drill so that each drill derives its supply of compressed air independently of the means for supplying the other drills. The pivoted member 44 of each drill carrier is also provided at a suitable distance from its outer end and on its rear side with an arm 52 which bears on the outer side of the rim 29 of the cutter head gear, and is connected thereto by a pivot bolt 53 which engages the threaded opening 38. The opposing faces of the arm 29 and the arm 52 of the drill carriers are provided with co-engaging radial corrugations 54 which are concentric with the pivot bolts 53 and coact with the latter to secure the drill carriers at any desired angular adjustment as indicated in Fig. 6. Hence the drill carriers may be disposed at any required angle to cause the drills to work with maximum effect against the breast of the tunnel according to the nature of the rock or other material which is being tunneled and other varying conditions.

At suitable points on the face of the web of the cutter head gear are mounted pivoted inner and outer carriers 55, 56 having drills 57, 58 which respectively operate in the wall of the tunnel and on the cylindrical side of the core which is formed as the machine progresses within that portion of the tunnel which is not operated upon by the drills 42, the said core passing through the guard ring and a drum 22, and being broken off from time to time as the machine advances, the formation of this core, as will be evident, greatly decreasing the quantity of drilling necessarily done by the machine in the breast of the tunnel. Each carrier 55, 56 is provided with a circular base 59, centrally pivoted on the web of the cutter head gear and provided with curved slots 60 concentric with said pivot and in which operate clamping screws 61 by means of which the said drill carriers may be securely clamped to the base of the cutter head gear at any desired adjustment. The drills 57, 58 are supplied with compressed air from the air chambers 49 of certain of the drill carriers 44, by means of suitable flexible tubes 62.
An air feeding tube 63 extends longitudinally over the upper side of the carriage, and has a nozzle 64 which is connected to the nipple 33 of the bearing sleeve 18. The said air supply pipe is provided with a suitable valve 65 and its rear portion is supported by a bracket 66 which is bolted on the upper side of the rear frame 7. The flexible air supply hose 67 usually employed in connection with machines of this character is coupled to the rear end of the tube 63 as at 68. A longitudinally disposed shaft 69 is mounted in suitable bearings on the head and rear end frames, and is provided at its front end with a pinion 70 which engages the gear 28. At the rear end of this shaft is a worm gear 71, which is engaged by a worm 72, which is on the shaft 73 of a suitable motor indicated at 74, the said motor and bearings for the said shaft being for the purposes of this specification, shown as mounted on brackets 75 which extend rearwardly from the rear frame 7 of the carriage. This motor may be of any suitable type and if the same is a compressed air motor, it will in that event, be connected to the pipe 63 and derive its supply of compressed air therefrom. It will be understood that the rotary cutter head is driven by the motor 74 through the instrumentality of the gears 72, 71, 70 and 28 hereinbefore described.

I will now describe my improved means for steadying the carriage in the tunnel when the machine is at work and for advancing the machine from time to time as the work progresses. A cross bar 76 is provided near its ends with yokes 77 which extend downwardly therefrom, and operate on longitudinally disposed guide rods 78, the rear ends of which are bolted as at 79 to the rear frame 7. The front ends of the said guide rods are secured by means of brackets 80 to cylinders 81 which are mounted in the sides of the carriage, the front ends of said cylinders being secured as at 82 to the bars 16. The brackets and heads of the said cylinders are here shown as secured in place by means of bolt rods 83. The front portions of the rods 78 are free to travel in the brackets 80 to compensate for the longitudinal adjustment of the bars 16 and sleeves 15 on the side bars 12 of the carriage. In each cylinder 81, is a piston 84 connected by a piston rod 85 to the cross bar 76. In the center of the said cross bar is a cylinder 86 open at its ends and to the center of which is connected one end of a flexible compressed air supply tube 87, which leads from the air pipe 63. Pistons 88 operate in the said cylinder and are provided with piston rods 89, the outer portions of which operate in guides 90 at the ends of the cross bar 76, and to the outer ends of the said piston rods are secured friction heads 91, each of which has at its outer side, a friction plate 92, the exterior face of which is milled or otherwise roughened as at 93 to adapt the same to engage and frictionally and firmly grip one side of the tunnel as indicated in Fig. 3, the bore of the tunnel being indicated by the dotted circle A.

It will be apparent from the foregoing description and by reference to the drawings that the said friction heads 91 engage opposite sides of the bore of the tunnel, and serve to prevent lateral vibrations of the carriage and casual direction of the latter in other than a right line, thus operating to keep the tunneling machine in the required position for prosecuting the work.

An air pipe 94 leads from the pipe 63 and is provided with a suitable valve 95. Branch pipes 96 are connected to the said pipe 94 and to the ends of the respective cylinders 81, each of the said branch pipes being provided with a suitable three-way valve 97 which enables either of the cylinders to be supplied with compressed air from either end at will, according to the direction in which it is desired to operate the pistons 84. It will be understood that by this means, the cross head with its friction heads 91 may be moved longitudinally with respect to the carriage as may be required to advance or back the latter, and hence my improved tunneling machine is provided with means by which it may be advanced to the work as the same progresses or withdrawn from the rest of the tunnel at any time as may be required.

In Fig. 1 of the drawings, I have indicated an endless conveyer B for taking out the chippings from the bottom of the tunnel and delivering the same to a car C the latter operating on a track D.

The anti-friction rollers 6 hereinbefore described bear against the rear side of the gear of the cutter head, and thereby prevent excessive friction between the hub 25 of the said gear and the front side of the bearing sleeve 18. A retaining ring 98 is secured on the rear end of the drum 22 by means of screws 99, and bears against the rear end of the bearing sleeve 18, thus co-acting with the hub 25 to prevent longitudinal movement of said drum in said sleeve in either direction.

Having thus described my invention I claim:—

1. In a tunneling machine, a carriage having an end frame provided with a bearing sleeve, in combination with a revoluble cutting head comprising an annular drum mounted for rotation in said bearing sleeve, a gear on said drum and a drill carrier mounted on said drum, and said gear, said drill carrier, said drum and said bearing sleeve having passages therein to convey fluid under compression to the drills.

2. In a tunneling machine, a carriage having an end frame provided with a bearing sleeve, in combination with a revoluble cutting head comprising an annular drum mounted for rotation in said bearing sleeve, a gear on said drum and a drill carrier mounted on said drum and said gear, said drill carrier, said drum and said bearing sleeve having passages therein to convey fluid under compression to the drills, and anti-friction rollers mounted on said frame and bearing against the rear side of said gear.

3. In a tunneling machine, a carriage having an end frame provided with a bearing sleeve, in combination with a revoluble cutting head comprising an annular drum mounted for rotation and a drill carrier mounted on said drum and said gear, said drill carrier, said drum and said bearing sleeve having passages therein to convey fluid under compression to the drills, the said gear having a rearwardly extending hub which bears against the front side of the said bearing sleeve, the said drum being provided with a ring on the rear side thereof disposed to bear on the rear side of said bearing sleeve.

4. In a machine of the class described, a carriage having a head frame provided with a bearing, in combination with a revoluble cutter head comprising an annular drum mounted for rotation in said bearing, a gear on said drum, and a drill carrier pivotally mounted near its outer end on said gear and at its inner end on said drum for angular adjustment with respect to the plane of rotation of said revoluble head.

5. In a machine of the class described, a carriage having a head frame provided with a bearing, in combination with a revoluble cutter head comprising an annular drum mounted for rotation in said bearing, a gear on said drum and a drill carrier pivotally mounted near its outer end on said gear and at its inner end on said drum for angular adjustment with respect to the plane of rotation of said head, and means to secure said drill carrier in adjusted position.

6. In a machine of the class described, in combination with a carriage having a head frame provided with a bearing, an annular drum mounted in said bearing, a gear on said drum, a drill carrier substantially radial with respect to said gear, said drill carrier and said drum having coacting means to pivotally mount the inner end of said carrier on said drum, said drill carrier being further provided near its outer end with an arm, and a pivot engaging said arm and connecting the same to the arm of said gear.

7. A tunneling machine having a revoluble cutter head provided with a drill carrier, said drill carrier comprising an inner member pivotally connected to the cutter head, and the pivotal axis of which is substantially radial to the cutter head, and an outer member detachably secured to the first named member, said members having openings in their opposing sides for the reception of the drills.

8. In a tunneling machine, a revoluble cutter head having a drill carrier substantially radial with respect thereto, and pivotally connected thereto, the pivotal axis of said drill carrier being substantially radial, with respect to the cutter head, and drills mounted in the said drill carrier to operate on the breast of the tunnel.

9. In a tunneling machine, the combination of a carriage having a head frame provided with a bearing sleeve, a revoluble cutter head comprising an annular drum mounted for rotation in said bearing sleeve, a gear on said drum, drill carriers disposed substantially radial with respect to said cutter head, drills mounted on said drill carriers for operation on the breast of a tunnel, and drills mounted on the front side of said gear for operation on the wall of the bore of the tunnel and on the periphery of the core formed on the breast.

10. In a tunneling machine, a revoluble cutter head having a drill carrier substantially radial, with respect thereto, and pivotally connected thereto, the pivotal axis of said drill carrier being substantially radial with respect to the cutter head, and drills mounted in the said drill carrier to operate on the breast of the tunnel, and disposed angularly with respect to one another.

11. In a machine of the class described, the combination of a main frame having longitudinally disposed guides, a cross bar movable on the said guides, fluid pressure actuated tunnel engaging means carried by the said cross bar, longitudinally adjustable bars on the said main frame, and fluid pressure actuated means for moving the said cross bar longitudinally of the frame on the said guides, the last named fluid pressure actuated means including cylinders connected to the said adjustable bars, and connected to the said guides for longitudinal movement on said guides.

12. A tunneling machine having a revoluble cutting head, drill carriers mounted on said cutter head for pivotal movement, the pivotal axes of said drill carriers being parallel with the plane of rotation of said cutter head, and drill carriers mounted on said cutter head for pivotal movement and having their pivotal axes at right angles to the plane of movement of said cutter head.

13. In a tunneling machine, a carriage having an end frame provided with a bearing sleeve, in combination with a revoluble cutting head, a drill carrier on said cutting head and drills on said drill carrier, said core forming member, and said drill carrier, having passages therein, to convey fluid under compression to the drills.

In testimony whereof I hereunto affix my signature in the presence of two witnesses.

WILLIAM R. COLLINS.

Witnesses:
R. D. MALIN,
GEO. DALGLEISH.

---

Copies of this patent may be obtained for five cents each, by addressing the "Commissioner of Patents, Washington, D. C."